UNITED STATES PATENT OFFICE.

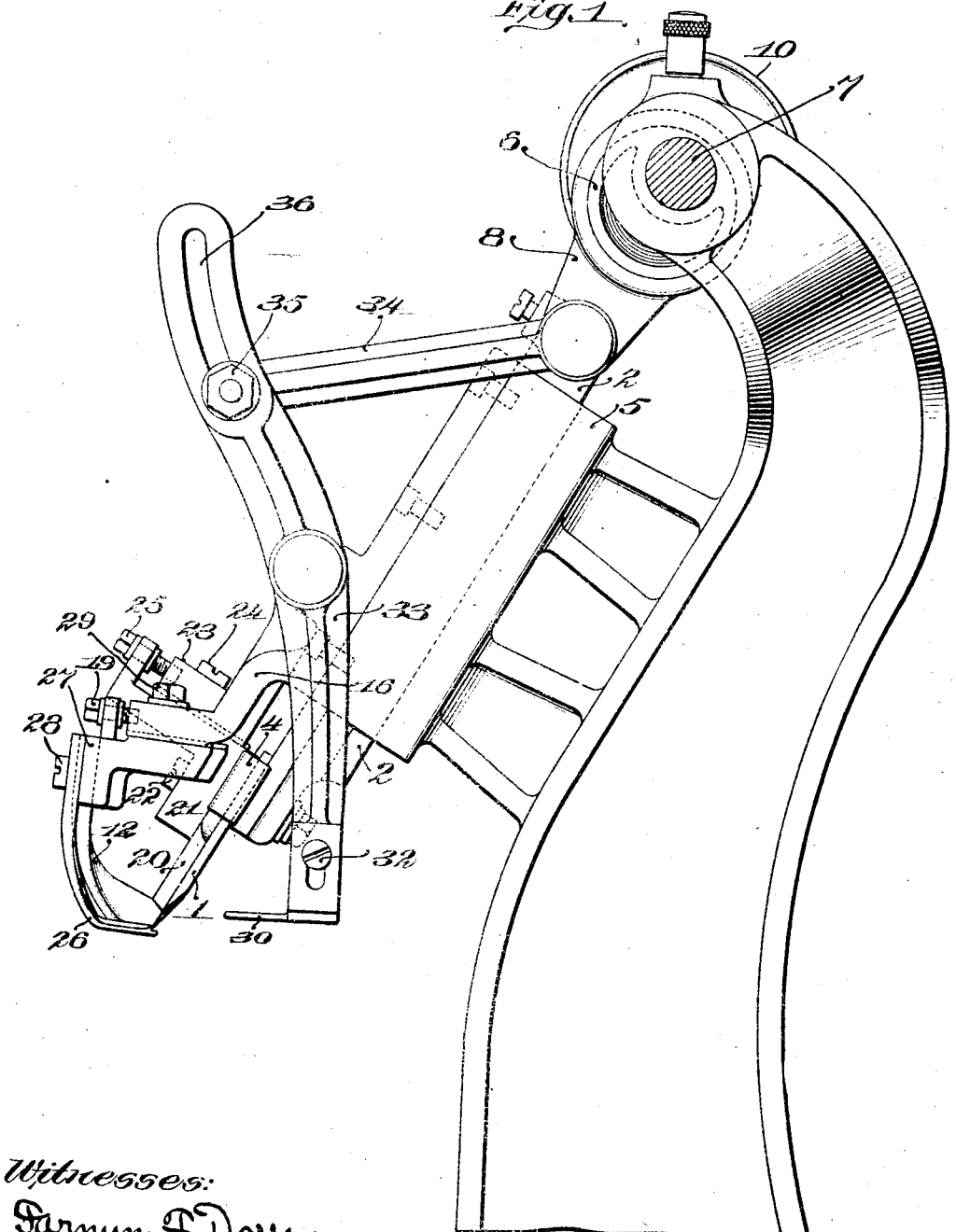

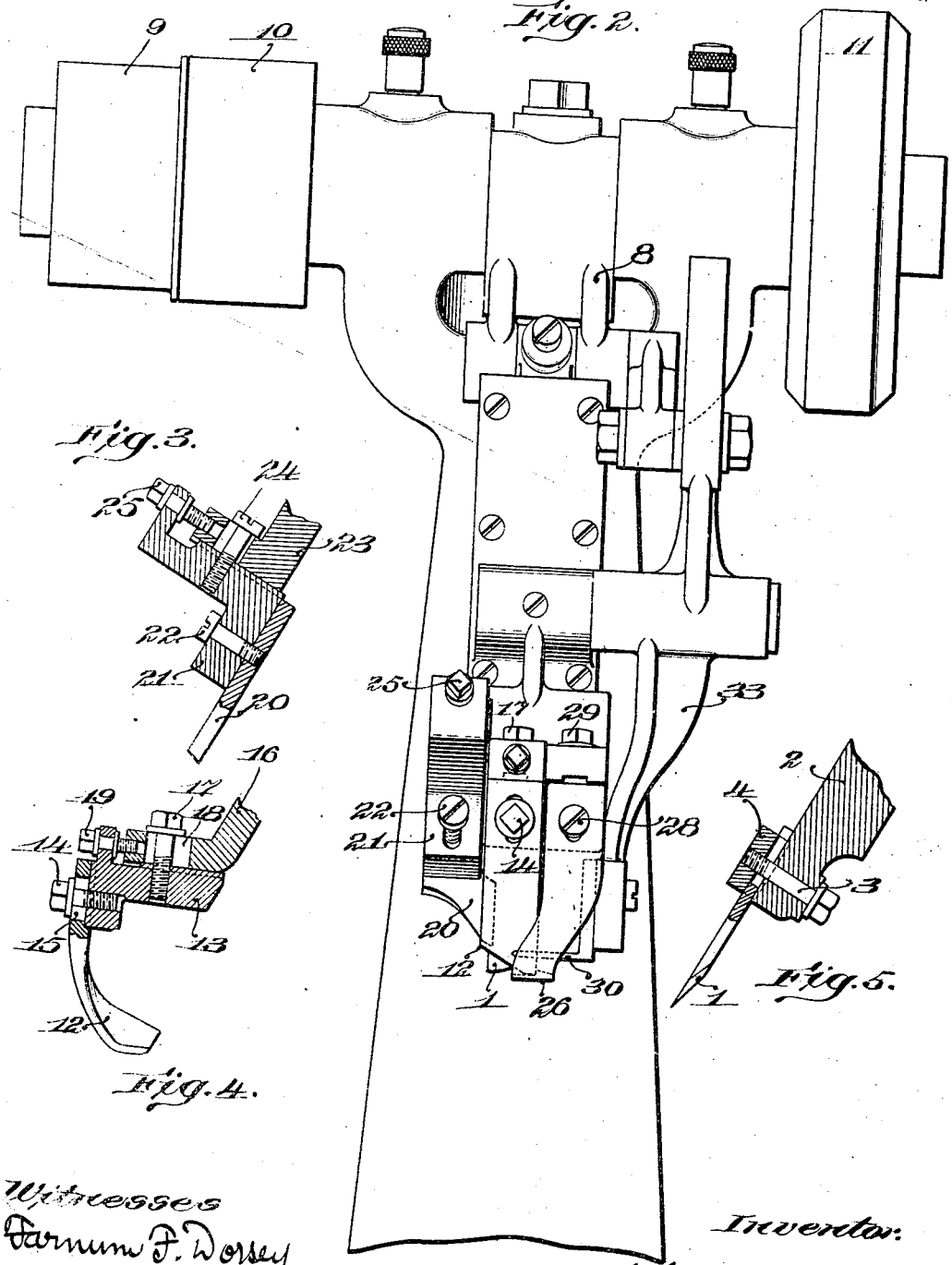

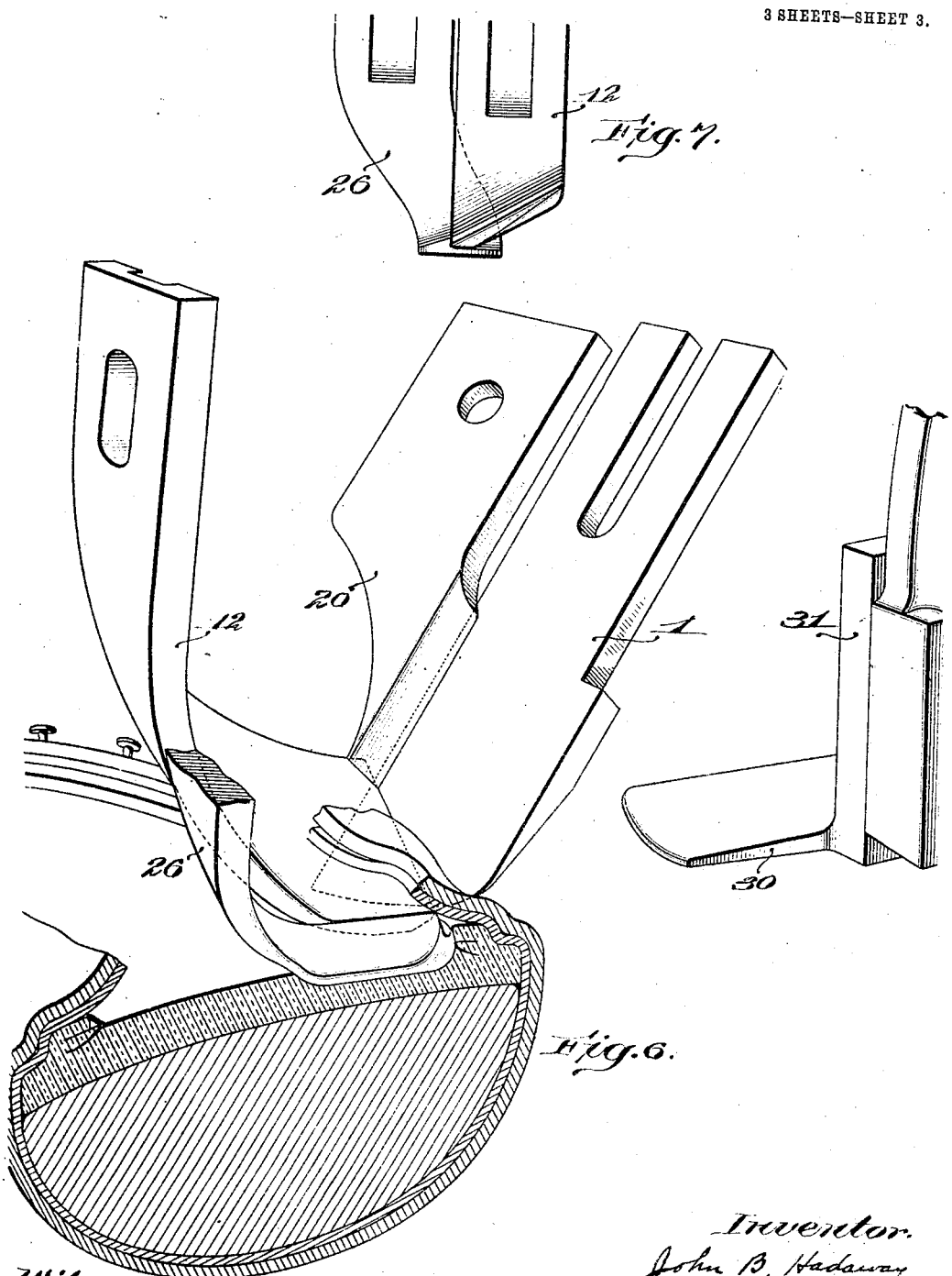

JOHN B. HADAWAY, OF BROCKTON, MASSACHUSETTS, ASSIGNOR TO UNITED SHOE MACHINERY COMPANY, OF PATERSON, NEW JERSEY, A CORPORATION OF NEW JERSEY.

VAMP-TRIMMING MACHINE.

968,554. Specification of Letters Patent. Patented Aug. 30, 1910.

Application filed September 16, 1905. Serial No. 278,743.

*To all whom it may concern:*

Be it known that I, JOHN B. HADAWAY, a citizen of the United States, residing at Brockton, in the county of Plymouth and State of Massachusetts, have invented certain new and useful Improvements in Vamp-Trimming Machines; and I do hereby declare the following to be a full, clear, and exact description of the invention, such as will enable others skilled in the art to which it appertains to make and use the same.

The present invention relates to vamp trimming machines which are used in the manufacture of shoes, and more particularly in the manufacture of welted shoes, to trim the projecting edges of the vamp and lining after the upper has been lasted and before the welt is sewed to the shoe, to prepare the shoe for the operation thereon of the inseam sewing machine.

The invention is intended primarily as an improvement on the vamp trimming machine disclosed in applicant's prior application Serial No. 215,509, filed July 6, 1904, but, except as defined in the claims, is not limited to the particular form of vamp trimming machine disclosed in said application, but may also be embodied in vamp trimming machines having trimming knives and other operating parts differently constructed and arranged or in vamp trimming machines of that class known in the art as inseam trimming machines which act on the shoe after the inseam has been sewn.

The objects of the present invention are to improve the construction and arrangement of the trimming knives of a vamp trimming machine, and particularly the construction and arrangement of the knife which extends inside of the vamp, to provide means for insuring the presentation of the edge of the vamp to the trimming knife or knives as the shoe is fed through the machine, and in general to improve the construction, arrangement and mode of operation of the various parts of vamp trimming machines.

With these objects in view a feature of the invention contemplates the provision in a vamp trimming machine provided with a knife for trmming the edge of the vamp, of a knife to coöperate therewith arranged to extend inside of the vamp of a lasted shoe, and having its blade angularly disposed with relation to the blade of the trimming knife so that the trimming knife cuts across the plane of the coöperating knife. The arrangement of the knife which extends inside of the vamp, with its blade angularly disposed with relation to the blade of the trimming knife, permits the use of a strong and serviceable knife which can be readily ground without liability of changing the shape of its cutting edge and the grinding of which does not reduce the blade sufficiently to necessitate replacement of the knife except at long intervals. The knife which extends inside of the vamp of the shoe is preferably fixed and the trimming knife is preferably arranged to vibrate as such knives can be arranged in a simple and compact manner and permit the shoe to be readily manipulated so as to present all portions of the edge of the vamp to the action of the knives, and, furthermore, act in a more satisfactory manner than other forms of knives to trim the vamp.

Another feature of the present invention contemplates the provision in a vamp trimming machine provided with a vamp trimming knife of simple and efficient means hereinafter described and claimed for bending the edge of the vamp inwardly toward the medial line of the shoe to insure its being brought into a position to be acted upon by the trimming knife.

In the machine disclosed in the application hereinbefore referred to means are provided for raising the vamp from the sole of the shoe and directing it between the cutting edges of the trimming knife and the fixed knife, this means consisting of a guide extending beneath the fixed knife and provided at its inner end with a vamp raising projection.

In accordance with a feature of the present invention a guide is provided for raising the vamp and directing it between the edges of the knives which extends in front of the fixed knife whereby the vamp is raised from the sole with greater certainty and any liability of the vamp passing beneath the fixed knife is avoided.

In addition to the features of invention above referred to, the present invention also consists in certain constructions and arrangements of parts hereinafter described and claimed, the advantages of which will be obvious to those skilled in the art from the following description:—

The various features of the present invention will be understood from an inspection of the accompanying drawings in which—

Figure 1 is a view in side elevation of a vamp trimming machine embodying the same in their preferred form; Fig. 2 is a view in front elevation of the machine; Fig. 3 is a detail sectional view illustrating a guide for the vibrating knife and the manner in which it is adjustably mounted on the machine frame; Fig. 4 is a detail view partly in section illustrating the fixed knife which extends beneath the vamp and its means of support and adjustment; Fig. 5 is a similar view illustrating the manner in which the vibrating trimming knife is adjustably secured to its carrier; Fig. 6 is a detail perspective view on an enlarged scale, illustrating the action of the machine in trimming the vamp of a lasted shoe; and Fig. 7 is a view in rear elevation of the fixed knife which extends beneath the vamp, and the guide extending in front of the fixed knife.

1 indicates the vibrating trimming knife which is adjustably secured to a reciprocating slide 2 by means of a bolt 3 passing through a slot in the knife and screwing into a clamping block 4. The slide 2 is mounted in an inclined guideway in a projection 5 from the frame of the machine, and reciprocating movements are imparted to the slide by means of an eccentric 6 upon the driving shaft 7 of the machine, and an eccentric strap 8 surrounding the eccentric and pivotally connected to the upper end of the slide. The shaft 7 is provided with belt pulleys 9 and 10 and with a balance wheel 11 and is constantly rotated during the operation of the machine.

The fixed knife, which extends inside of and beneath the vamp and which coöperates with the vibrating trimming knife 1, is indicated at 12. The shank of this knife extends vertically and the blade of the knife is curved inwardly as best shown in Figs. 1 and 6, the portion of the blade in proximity to the vibrating trimming knife being substantially at right angles to the blade of the trimming knife. The cutting edge of the knife 12 is formed at the inner end of the blade, and the trimming knife reciprocates across the blade. The fixed knife 12 is sharpened by grinding the surface at the inner end of the knife, and it will be evident that this grinding does not weaken the blade and that a large portion of the blade can be ground away before the knife is rendered unfit for use.

It is desirable that the cutting edges of the vibrating and fixed knives be arranged to produce a shearing cut, and to this end the cutting edge of the vibrating knife is arranged to extend obliquely across the end of the blade of the knife, and the blade of the fixed knife is so arranged that its cutting edge extends at an angle to the sole of a shoe presented to the knives. This arrangement of the blade of the fixed knife brings its forward end close to the sole of a shoe so that the vamp and lining are readily raised from the sole upon the blade of the knife, and removes the rear edge of the blade a sufficient distance from the sole of the shoe to enable the vibrating knife to move a sufficient distance toward the shoe to trim the vamp without liability of cutting into the insole.

To enable the fixed knife 12 to be adjusted both vertically and horizontally to bring its cutting edge into a position to coöperate with the cutting edge of the vibrating knife, it is secured to a block 13 by means of a screw 14 passing through a vertical slot 15 in the shank of the knife and screwing into the block, and the block 13 is secured to a rigid bracket 16 on the frame of the machine by means of a screw 17 passing through a slot 18 in the bracket and screwing into the block. To facilitate the adjustment of the block 13 on the bracket 16 an adjusting screw 19 is journaled in a projection on the block 13 and screws into the bracket 16.

In its retracting movement the vibrating knife 1 is moved until the rear portion of its cutting edge is nearly or quite separated from the cutting edge of the fixed knife in order to provide a sufficient space between the cutting edges of the knives to receive the vamp and lining. To maintain the cutting edge of the vibrating knife in alinement with the cutting edge of the fixed knife when the vibrating knife is retracted, a stationary guide 20 is provided which bears directly against the blade of the vibrating knife. This guide is secured to a block 21 by means of a screw 22, and the block 21 is adjustably secured to a bracket 23 on the frame of the machine by means of a screw 24 passing through a slot in the bracket. The block 21 is adjusted on the bracket 23 by means of an adjusting screw 25 journaled in the block 21 and screwing into the bracket, the block being locked in position after adjustment by means of the screw 24.

The guide for raising the vamp and directing it between the edges of the vibrating and fixed knives is indicated at 26. The shank of the guide is secured to a bracket 27 so as to be adjustable vertically thereon by means of a screw 28, and the block 27 is secured to the bracket 16 so as to be capable of a horizontal adjustment thereon by means of a screw 29. At its lower end the guide extends inwardly and is provided with a seat which receives the front edge of the blade of the fixed knife as indicated in Figs. 2 and 7. The guide extends in front of the blade of the fixed knife and its upper surface forms a continuation of the upper surface of the fixed blade. The guide bears against the sole of the shoe presented to the machine and forms a sole guide in addition to forming a means for raising the vamp from the sole and directing it between the cutting edges of the knives. At its inner end the guide projects beyond the cutting edge of the fixed blade into a position to bear against the lip of the insole, and thus also acts as a lip guide.

The vibrating bending device for engaging the upper and bending it inwardly between the cutting edges of the knives is indicated at 30, and consists of a plate projecting from a block 31 adjustably secured by means of a screw 32 to the lower end of a lever 33. The lever 33 is pivoted upon the frame of the machine and is connected at its upper end by means of a link 34 to the reciprocating slide 2 so that at each reciprocation of the slide and the vibrating trimming knife mounted thereon an oscillating movement is imparted to the bending device. The bending device moves across the plane in which the vibrating knife cuts and between the cutting edges of the knives when the vibrating knife is retracted. A portion of the plate 30 extends in advance of the knives as is clearly shown in Fig. 1, so that the proper action of the plate on the vamp as it is fed to the knives is insured. To provide means for adjusting the extent of movement imparted to the bending device the link 34 is adjustably connected to the upper end of the lever 33 by means of a bolt 35 passing through a curved slot 36 in the lever.

The shoe is presented to the machine as indicated in Fig. 6, the surface of the sole being in a plane inclined to the plane in which the vibrating trimming knife cuts and the lip of the sole extending in a direction substantially parallel with this plane. As the shoe is fed it is guided by the engagement of the guide 26 with the sole and with the inner surface of the lip of the sole. The guide 26 also raises the lining and vamp from the sole in case they are pressed down against the sole, and the bending device bends the vamp and lining inwardly in case they are standing away from the sole and out of the path of movement of the vibrating trimming knife. The vibrating trimming knife is actuated at a high rate of speed and the shoe is fed along practically continuously, the shape and arrangement of the trimming knives and of the guide 26 permitting the shoe to be manipulated to present all portions of the edges of the vamp and lining to the action of the trimming knife.

The nature and scope of the present invention having been indicated, and a machine embodying the various features of the present invention in their preferred form having been specifically described, what is claimed is:

1. A vamp trimming machine, having, in combination, a trimming knife for trimming the edge of the vamp, and a coöperating knife arranged to extend inside of the vamp of a lasted shoe having its blade angularly disposed with relation to the blade of the trimming knife and provided with a cutting edge at its end, said trimming knife cutting across the plane of the coöperating knife blade.

2. A vamp trimming machine, having, in combination, a trimming knife for trimming the edge of the vamp, a coöperating fixed knife arranged to extend inside of the vamp of a lasted shoe, and a guide extending in front of the fixed knife arranged to raise the vamp and direct it between the cutting edges of the knives.

3. A vamp trimming machine, having, in combination, a vibrating trimming knife for trimming the edge of the vamp, a fixed knife coöperating therewith arranged to extend inside of the vamp, and a vibrating bending device movable between the cutting edges of the knives when the trimming knife is retracted and acting to bend the edge of the vamp inwardly between said cutting edges.

4. A vamp trimming machine, having, in combination, a trimming knife for trimming the edge of the vamp, and a vibrating bending device movable across the plane in which the trimming knife cuts for bending the edge of the vamp inwardly toward the medial line of the shoe into a position to be acted upon by the trimming knife.

5. A vamp trimming machine, having, in combination, a vibrating trimming knife for trimming the edge of the vamp, a coöperating fixed knife having its blade angularly disposed with relation to the blade of the trimming knife and arranged to extend inside of the vamp of a lasted shoe, and a guide directly engaging the vibrating knife to maintain its cutting edge in alinement with the cutting edge of the fixed knife when separated therefrom.

6. A vamp trimming machine, having, in combination, a vibrating trimming knife for trimming the edge of the vamp, a coöperating fixed knife arranged to extend inside of the vamp of a lasted shoe having its blade angularly disposed with relation to the blade of the trimming knife and provided with a cutting edge at its end, said trimming knife cutting across the plane of the coöperating knife blade.

7. A vamp trimming machine, having, in combination, a trimming knife for trimming the edge of the vamp, and a coöperating fixed knife having its blade angularly disposed with relation to the blade of the trimming knife and arranged to extend inside of the vamp of a lasted shoe with its cutting edge at an angle to the sole of the shoe.

8. A vamp trimming machine, having, in combination, a trimming knife for trimming the edge of the vamp, a coöperating knife arranged to extend inside of the vamp of a lasted shoe, and means acting on the vamp in front of said coöperating knife to raise the vamp and direct it between the cutting edges of the knives.

9. A vamp trimming machine, having, in combination, a trimming knife for trimming the edge of the vamp, a coöperating knife arranged to extend inside of the vamp of a lasted shoe, and a guide extending in front of said coöperating knife arranged to bear on the sole inside of the lip and raise the vamp and direct it between the cutting edges of the knives.

10. A vamp trimming machine, having, in combination, a vibrating trimming knife for trimming the edge of the vamp, a knife coöperating therewith, and a vibrating bending device movable between the cutting edges of the knives when the trimming knife is retracted and acting to bend the edge of the vamp between the cutting edges of the knives.

11. A vamp trimming machine, having, in combination, vamp trimming mechanism including a vibrating vamp trimming knife, a vibrating vamp bending device for bending the vamp into a position to be acted upon by the knife and means for actuating the vibrating knife and bending device acting to advance the bending device toward the shoe when the knife is retracted.

12. A vamp trimming machine, having, in combination, vamp trimming mechanism including a vibrating vamp trimming knife, a vibrating vamp bending device to engage the vamp and bend it into position to be acted upon by the knife, carriers for the knife and bending device, means for vibrating the knife carrier and a link connecting the carriers for actuating the vamp bending device.

In testimony whereof I affix my signature, in presence of two witnesses.

JOHN B. HADAWAY.

Witnesses:
FRED O. FISH,
ALFRED H. HILDRETH.